(12) United States Patent
Chem

(10) Patent No.: US 8,113,148 B2
(45) Date of Patent: Feb. 14, 2012

(54) PET HOUSE

(76) Inventor: Shiuan Kuen Chem, Arcadia, CA (US)

( * ) Notice: Subject to any disclaimer, the term of this patent is extended or adjusted under 35 U.S.C. 154(b) by 334 days.

(21) Appl. No.: 12/454,197

(22) Filed: May 13, 2009

(65) Prior Publication Data

US 2009/0223463 A1  Sep. 10, 2009

Related U.S. Application Data

(63) Continuation-in-part of application No. 11/398,299, filed on Apr. 4, 2006, now abandoned.

(51) Int. Cl.
*A01K 1/03* (2006.01)
(52) U.S. Cl. .......................... 119/500; 119/482
(58) Field of Classification Search .................. 119/500, 119/470, 452, 459, 482
See application file for complete search history.

(56) References Cited

U.S. PATENT DOCUMENTS

| | | | | | |
|---|---|---|---|---|---|
| 2,712,677 | A * | 7/1955 | Hyde | ................................ | 52/66 |
| 2,732,826 | A * | 1/1956 | Dawson | ........................ | 119/482 |
| 3,527,191 | A * | 9/1970 | Zimmitti et al. | ........... | 119/51.11 |
| 3,995,592 | A * | 12/1976 | Goldstaub et al. | ............ | 119/500 |
| 4,334,501 | A * | 6/1982 | McDaniel et al. | ............ | 119/482 |
| 4,546,730 | A * | 10/1985 | Holland | ........................ | 119/780 |
| 4,688,520 | A * | 8/1987 | Parks | ........................ | 119/51.11 |
| 5,003,288 | A * | 3/1991 | Wilhelm | .................... | 340/457.2 |
| 5,003,923 | A * | 4/1991 | Morgan | ........................ | 119/482 |
| 5,349,924 | A * | 9/1994 | Hooper, Jr. | ................... | 119/496 |
| 5,433,171 | A * | 7/1995 | Ewell | ........................... | 119/51.5 |
| 5,819,686 | A * | 10/1998 | Credeur | ....................... | 119/51.5 |
| 5,842,439 | A * | 12/1998 | Selstad | ........................ | 119/481 |
| 5,937,792 | A * | 8/1999 | Madrid | ........................ | 119/482 |
| 6,487,987 | B1 * | 12/2002 | Choi | ............................ | 119/51.5 |
| 6,490,995 | B2 * | 12/2002 | Greene, Jr. | ..................... | 119/496 |
| 6,571,738 | B2 * | 6/2003 | Rivard | ........................ | 119/419 |
| 7,353,775 | B1 * | 4/2008 | Stelmach | ................... | 119/61.54 |
| 2002/0148410 | A1 * | 10/2002 | Thomas | ....................... | 119/452 |
| 2006/0011145 | A1 * | 1/2006 | Kates | ........................... | 119/719 |
| 2006/0054102 | A1 * | 3/2006 | Hailey | ......................... | 119/482 |
| 2007/0107667 | A1 * | 5/2007 | Morris | ........................ | 119/482 |
| 2007/0181069 | A1 * | 8/2007 | Jack | ............................ | 119/61.1 |

* cited by examiner

*Primary Examiner* — Rob Swiatek
*Assistant Examiner* — Ebony Evans
(74) *Attorney, Agent, or Firm* — Raymond Y. Chan; Davidand Raymond Patent Firm

(57) ABSTRACT

A pet house, for providing convenient and comfortable accommodation for a pet, includes a housing and a plurality of amenities. The housing includes a surrounding wall having a lodging room for the pet accommodating therein, and a side entrance communicating with the lodging room, and a roof frame, which is supported on the surrounding wall to define the lodging room within the surrounding wall and the roof frame. The amenities, including at least one of a solar power system, a power storage, a ventilating device, a dimmer light, an audio device, a remote intercommunication system, and an outdoors shading arrangement, is provided at the pet house for providing the comfort and convenience of the pet house so as to enhance the quality of living.

6 Claims, 7 Drawing Sheets

PET HOUSE

CROSS REFERENCE OF RELATED APPLICATION

This is a Continuation-In-Part application of a non-provisional application having an application Ser. No. 11/398,299 and a filing date of Apr. 4, 2006 now abandoned.

BACKGROUND OF THE PRESENT INVENTION

1. Field of Invention

The present invention relates to a pet house, and more particularly to a pet house which not only provides a shelter for the pet, but also provide other necessities for a pet while it is inside the pet house, such as providing water, food and storage spaces for other pet accessories while the pet is to stay in the pet house. It also provide added convenience to the pet owner while the owner brings the pet out with him in the pet house.

2. Description of Related Arts

There are a lot of pet houses, especially dog houses, in the market already. The reason is that people love their pets so much that they would consider their pets as their family members, and would want their pets to enjoy as much luxury as they could.

Pet houses have always given people the impressions of temporary stay for the pet, not sturdy, and inconvenient as food and water has to be provided separately to the pet even when the pet is in the pet house. The pet would have to constantly walk in and out of the pet house just to obtain food and water.

The greatest problem is that most pet owners must have experienced that conventional pet houses are easy to tip over. Whether the pet houses are used for containing small or big pets, they are all easy to tip over. The reason is that pet houses are usually made of material that is light in weight and cheap, so as to cut down the manufacturing cost for the pet houses.

However, when small pets are in those pet houses, due to the light combined weight, a pet house can easily be kicked around by human beings, and may result in tipping over of the pet house along with the pet.

The problem of tipping over also occurs to larger pets, especially when such large pets walk into or out of the pet house. Due to the fact that the house is relatively light in weight in comparison to the large pets, when they walk through the side entrance of the pet house, their big body would usually very often hit the side entrance of the pet house, and knock around or tip over the entire pet house. This problem does not only cause danger to the pets, but also to the people around the pet houses.

Also, a conventional pet house offers no assistance to the pet owner in provide food or water to the pet, such that pet owners may find it difficult to provide food for the pet efficiently. Such pet houses required external food and water dispenser, such that if the owner wants the pet to be fed in a timely manner, the owner must be present when it is the pet's feeding time to pour the pet food into a bowl and water into another for the pet.

As a result, a pet owner usually finds going anywhere for a longer time, such as a leisure or business trip, without having to worry about the pet's feeding and water situation impossible. The pet owner either has to find a "pet-sitter", put the pet in a pet hotel, or feed the pet not at a time that the pet prefers. Insecurity in the pet will easily accumulate if it happens often and pet owners would know how painful that can be.

Due to the fact that conventional pet houses are not entirely pet friendly, inconvenient to the owners and may cause danger to the pets and people, a better pet house that can eliminate the drawbacks as explained above has to be provided.

SUMMARY OF THE PRESENT INVENTION

A main object of the present invention is to provide a pet house, comprising a housing, which has a base, and a surrounding wall which has a lodging room for a pet to be accommodated therein. The pet house further has a good storage such that pet food can be contained by the pet house and dispensed by a food dispensing arrangement, and a water dispenser to dispense water for the pet to drink, wherein the dry pet food and water provided through the pet house will not only increase the weight of the pet house, thereby allowing gravitational force to hold the pet house much at one point, so as to provide a sturdier and safer pet house for the pet as well as for the owner of the pet, but also provide convenience to the owner and the pet.

Another object of the present invention is to provide a pet house, wherein the pet house provides a convenient storage of things that is needed by the pet, so that the pet owner does not have to worry about what the pet needs when the owner need to leave the pet at home, wherein the pet house does not only provide food and water, but also provide a comfortable environment for the pet.

Another object of the present invention is to provide a pet house, wherein the dispensing of the dry pet food uses gravitational force and in a controlled manner, especially by the owner, through an operation of the food dispensing arrangement either manually or automatically.

Another object of the present invention is to provide a pet house, wherein the pet house allows the pet owners to feed their pets conveniently and in a no-mess and clean manner.

Another object of the present invention is to provide a pet house, wherein all electrical parts are run by dry battery cells, such that no complicated and dangerous circuitries are needed.

Another object of the present invention is to provide a pet house, wherein the dry pet food is stored within the pet house in an airtight manner, such that the dry pet food remains fresh within the pet house.

Another object of the present invention is to provide a pet house, wherein the food storage has a funnel shape for smoother dispensing of the dry pet food by making use of gravitational force.

Another object of the present invention is to provide a pet house, wherein each dispensing action dispenses one portion of dry pet food for the pet.

Another object of the present invention is to provide a pet house, wherein the water dispenser provides water to the pet through a ball joint end, wherein the amount of water provided is controlled by the pet itself through licking the ball joint end.

Another object of the present invention is to provide a pet house, wherein a water source of the water dispenser is a water hose, which not only acts as a water dispenser to the pet, but also used for cleaning the pet house whenever necessary, such that the pet house is not only convenient for both the pet and the pet owner, but can also provide easy cleaning of the pet house for the owner, allowing the owner to provide a clean and comfortable environment for the pet.

Another object of the present invention is to provide a pet house, wherein the pet house has a ventilating fan for providing ventilation for the pet while the pet is placed within the pet house.

Another object of the present invention is to provide a pet house, wherein the pet house has an outdoors shading arrangement which has an umbrella compartment for containing an outdoor umbrella which can be used for providing a shaded area for the pet when needed from sunshine or rain.

Another object of the present invention is to provide a pet house, wherein the roof of the pet house has an umbrella holder provided on the housing adapted for supporting the outdoor umbrella, such that the pet can be shielded from sun or rain without having the owner to hold the umbrella.

Another object of the present invention is to provide a pet house, wherein the pet house further has an accessory compartment designated for containing other accessories for the pet, such that the pet's accessories can be stored appropriately and easily found.

Another object of the present invention is to provide a pet house, wherein the pet house further has a guiding light for providing light to the pet around the pet house when it is dark.

Accordingly, in order to accomplish the above objects, the present invention provides a pet house for accommodating a pet therein, comprising:

a housing which comprises:

a surrounding wall having a lodging room for the pet accommodating therein, and a side entrance communicating with the lodging room; and a roof frame, which is supported on the surrounding wall, comprising a ceiling wall mounted on top of the surrounding wall to cover the lodging room and a roof cover movably mounted on the ceiling wall, wherein a food storage is formed between the ceiling wall and the roof cover and is arranged for storing pet food to add an additional weight as a downward loading force on the housing so as to enhance the housing in a stably constructing manner.

These and other objectives, features, and advantages of the present invention will become apparent from the following detailed description, the accompanying drawings, and the appended claims.

DETAILED DESCRIPTION OF THE PREFERRED EMBODIMENT

Figure 1:
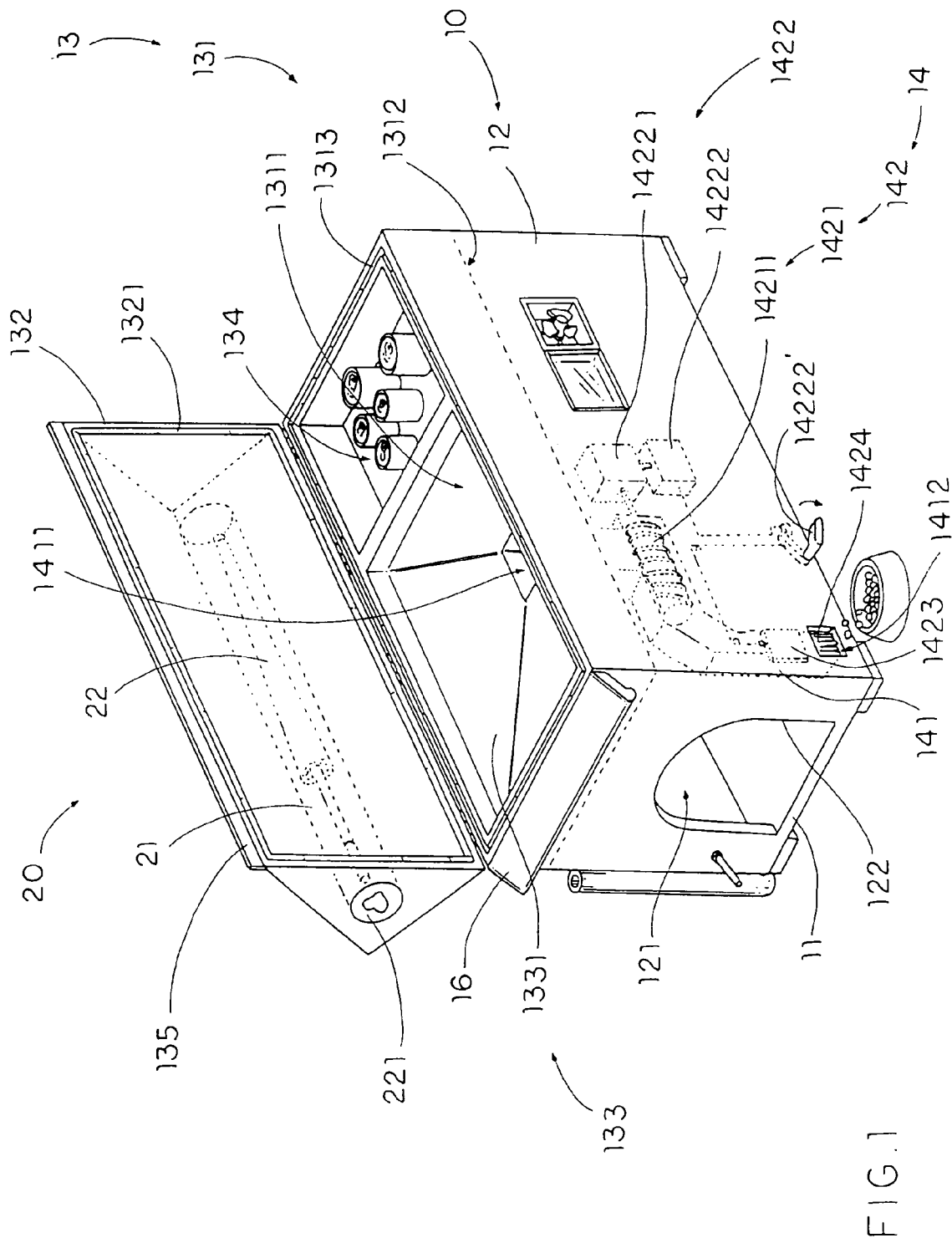
FIG. 1 is a perspective view of the pet house in an opened position according to the preferred embodiment of the present invention.

Referring to FIG. 1 of the drawings, a pet house for accommodating a pet therein according to a preferred embodiment of the present invention is illustrated, wherein the pet house comprises a housing 10.

The housing 10, having a base 11, comprises a surrounding wall 12 upwardly extending from the base 11 defining a lodging room 121 therewithin so as to accommodate the pet. In order for the pet to move in and out of the lodging room 121, a side entrance 122 communicating with the lodging room 121 is provided on the surrounding wall 12.

To facilitate easy transportation of the pet house, the pet house is made of a lightweight but durable material, such that less energy is spent on transporting the parts in the assembly line during the manufacture of the pet house, and less difficult for the owner to move the pet house from the store to home, or moving the pet house around at home.

The housing 10 also has a roof frame 13 which is supported on the surrounding wall 12. The roof frame comprises a ceiling wall 131 and a roof cover 132. The ceiling wall 131 is mounted on top of the surrounding wall 12 to cover the lodging room 121 while the roof cover 132 is movably mounted on the ceiling wall 131 in such a manner that a food storage 133 is formed between the ceiling wall 131 and the roof cover 132.

Many pet owners purchase toys for the pet, canned pet food, and other accessory items such as pet clothing and leash for the pet. In order to provide a convenient pet house for the pet owner, the roof frame 13 may be partitioned by a partition wall, such that the food storage 133 is adjoined by an accessory compartment 134, which is provided for the owner to put any miscellaneous items for the pet.

The roof frame 13 is made of a waterproof material and is detachably mounted on top of the surrounding wall 12, so as to allow the housing 10 to be disassembled for transporting and cleaning purposes.

In order to provide easy-transportation of the pet house, the housing 10 further comprises an eave handle 16, which outwardly and inclinedly extend from the surrounding wall 12 at a position above the side entrance 122. The eave handle 16 is provided for the owner to easily grab hold of the pet house, such that the owner does not have to struggle as to how the pet house can be carried. Furthermore, due to the fact that the eave handle 16 is extended outwardly from the housing, the eave handle 16 also has a sheltering effect, which would prevent rain from drifting into the side entrance 122 of the housing.

In order to provide easy-lifting of the pet house, the roof frame 13 further comprises a lifting eave 135, which outwardly and inclinedly extend from the roof cover 132. The lifting eave 135 is provided for the owner to easily grab hold of the roof cover 132, such that the owner does not have to struggle to lift the roof cover 132 when refilling dog food into the food storage 133 is required.

It should be noted that the food storage 133 is arranged for storing a pet food, especially a dry pet food, so as to add an additional weight to the pet house as a downward loading force on the housing 10 when the pet house is finally located at a location where the pet is going to spend a substantial amount of time in the pet house, so as to enhance the housing 10 in a stably constructing manner.

For example, when the owner has finally brought the pet house home for the pet to live in the pet house daily, due to the fact that the house was built in an easy-to-transport, lightweight but durable material, just as most conventional pet houses are, the pet house may easily be knocked around or tip over. The purpose of storing a dry pet food in the pet house not only would provide convenience to the pet owner because no extra storage place is required to store the dry pet food, but also provide a heavier weight, therefore more stability, to the pet house, such that it would be safer for the pet to stay in the pet house. A conventional pet house simply has a frame for sheltering the pet and has always had the problem of being easily tipped over.

The ceiling wall 131 separates the roof frame 13 from the housing 10, in such a manner that an upper portion 1311 of the ceiling wall 131 is a bottom of the roof frame 13, whereas a lower portion 1312 of the ceiling wall 131 is a ceiling of the housing 10. The food storage 133 is provided for containing pet food, particularly dry pet food, due to the fact that the pet house helps dispensing the dry pet food to the pet.

The food storage 133 allows a user to store pet food into the pet house, such that the owner does not have to separately store the pet food, therefore making the pet house more convenient for the owner attend to the pet when the pet needs food.

It is worth mentioning that, unlike conventional pet houses, the pet house according to the present invention combines the weight of dry pet food into the pet house, such that not only does the pet house has the weight of the frame, but also the pet food, wherein gravitational force can better hold the pet house in the place it is placed upon, preventing the pet house from being kicked around or tip over accidentally by human beings, dragged along when the pet moves around in, or in and out of the pet house. The pet house also provides a more centralized storing for the things of the pets.

In order to allow pet food to be dispensed out of the pet house for the pet to eat, the pet house has a food dispensing arrangement 14 provided for dispensing the pet food from the food storage 133, wherein the food dispensing arrangement 14 comprises a food channel 141 and a food control valve 142.

The food channel 141 has a food inlet 1411 and a food dispensing outlet 1412 wherein the food inlet 1411 is extended to the ceiling wall 131 to communicate with the food storage 133 while the food dispensing outlet 1412 is downwardly extended to a bottom side of the housing.

The food control valve 142 is operatively coupled with the food channel 141 for controlling a predetermined amount of the pet food dispensed from the food storage 133 at the food inlet 1411 to the food dispensing outlet 1412, such as the pet food stored in the food storage 133 will be dispensed towards the food dispensing outlet 1412 through the food channel 141.

It is worth mentioning that the food channel 141 is provided in such a manner that the pet food is dispensed through the food dispensing outlet 1412 by gravitational force, such that no power is required and jamming of the food channel 141 prevented.

In order for the food dispensing arrangement 14 to more effectively dispense pet food to the food dispensing outlet 1412, a bottom wall 1331 of the food storage 133 has a funnel shape, such that the bottom wall 1331 of the food storage 133 is sloped towards the food inlet 1411 for guiding the pet food to move towards the food inlet 1411 by gravity.

It is worth mentioning that the funnel shape of the bottom wall 1331 of the food storage 133 is not only provided for a convenient pet food dispensing towards the food dispensing outlet 1412, it is also for keeping the freshness of the pet food stored within the roof frame 13.

The reason is that after pouring in a batch of pet food, due to gravitational force, the pet food would accumulate naturally at the bottom wall 1331 of the food storage 133 of the downwardly sloped roof frame 13, such that when it is time to pour a new batch of pet food into the food storage 133 after substantial consumption of the old batch, the new pet food would naturally pile on top of the old batch of pet food, and will not be easily mixed together with the old batch accumulated at the bottom wall 1331 of the roof frame 13. As can be seen, the old batch of pet food will be consumed before the new batch.

The food control valve 142 comprises a dispensing rotor 1421 and a driving device 1422. The dispensing rotor 1421 has a food propeller 14211, which is rotatably supported within the food channel 141 at the food inlet for controllably feeding a predetermined amount of the pet food from the food storage 133. The driving device 1422 operatively drives the dispensing rotor 1421 to rotate at a predetermined number of revolutions so as to dispense the pet food to the food dispensing outlet 1412. Obviously, the number of revolutions for a small dog will be less than that of a larger dog, such that less food will be dispensed for a small dog.

The food propeller 14211 is provided such that when a pet food is first poured into the food storage 133 of the roof frame, the pet food will go through the food inlet 1411, but will be accumulated at the food propeller 14211 when it is not in operation. And when the food control valve 142 is in operation, the food that has already reached the food propeller 14211 will be rotated out of the food propeller 14211 and towards the food channel 141 when the driving device 1422 drives the dispensing rotor 1421.

According to FIG. 1 of the drawings, the food propeller 14211 is a spiral structure on the dispensing rotor 1421, which is like a screw, such that the pet food would accumulate around the spiral structure of the food propeller. When the food propeller 14211 is being driven by the driving device 1422, the pet food will be spiraled out of the food channel 141.

After some food is dropped through the from the food propeller 14211 to the dispensing channel 141, due to gravitational force, more pet food that has been stored in the food storage 133 will naturally dropped through the food inlet 1411 towards the food propeller 14211.

The dispensing rotor 1421 is powered by electricity, the source of which is a battery. The reason why electricity from socket is not preferred is that it would involve complicated circuitry with electrical wires, which would create be hazardous to the pet, due to the fact that most pets love biting things and if they do bite into the wires, the pet may be electrically shocked.

The driving device 1422 comprises a motor 14221 and an actuation 14222, wherein the motor 14221 operatively drives the dispensing rotor 1421 to rotate, such that the pet food is dispensed to the food dispensing outlet 1412. The actuation 14222 is provided for actuating the motor 14221 to operate and drive the dispensing rotor 1421.

Figure 4:
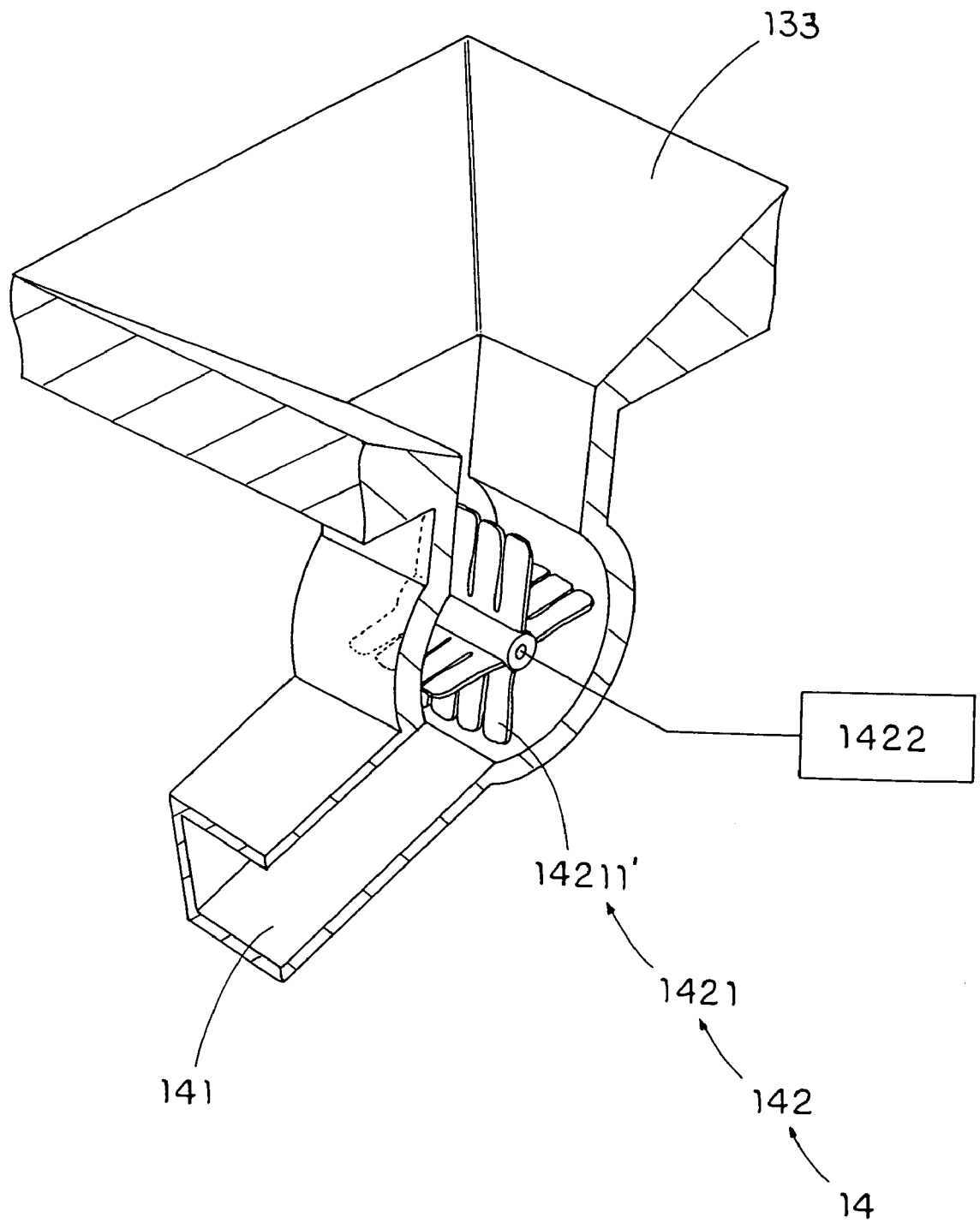
FIG. 4 is a perspective view of the food propeller according to an alternative embodiment of the present invention.

Alternatively, according to FIG. 4 of the drawings, the food propeller 14211' is radially and outwardly extended from the dispensing rotor 1421, such that the pet food is accumulated between the dispensing rotor 1421 and the food propeller 14211', such that when the food propeller 14211' is being driven by the driving device 1422, pet food within the food propeller 14211' and the dispensing rotor 1421 will be rotated out of the food channel 141.

According to FIG. 1 of the drawings, the actuation 14222 may be a manual or automatic actuation. When the actuation 14222 is manual, the actuation is a pedal 14222', which the pet owner may simply step on the pedal 14222' which then actuates the motor 14221 which in turn controls the rotation of the food propeller 14211 so as to dispense the pet food to the food dispensing outlet 1412.

Figure 3:
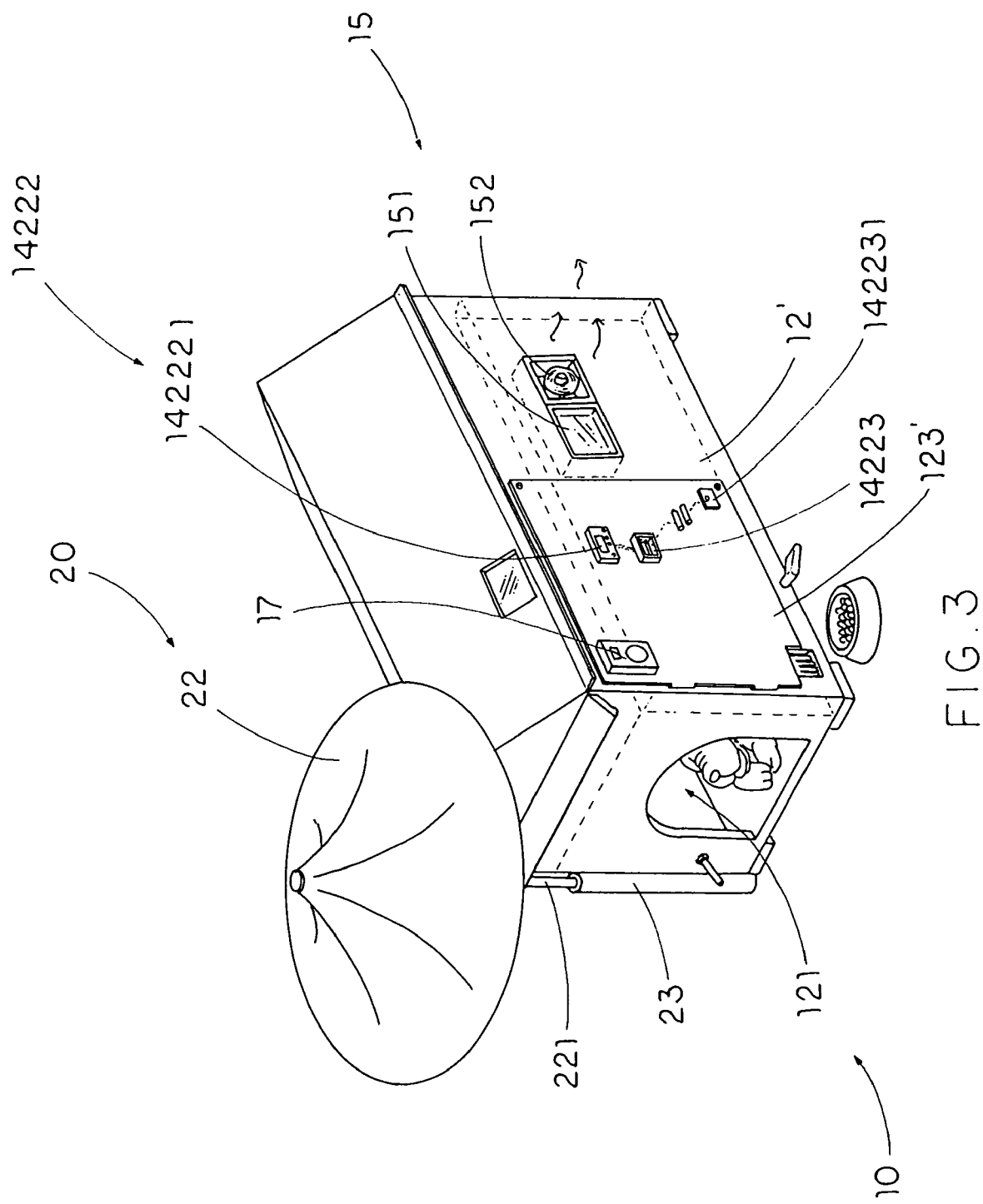
FIG. 3 is a perspective view of the pet house in a closed position illustrating the umbrella in the umbrella holder according to the preferred embodiment of the present invention.

According to FIG. 1 and FIG. 3 of the drawings, when the actuation 14222 is automatic, the actuation is a digital control panel 14222 which has a display 142221. The digital control panel 14222 is programmable and run on a battery which is contained by a battery chamber 14223. The battery chamber 14223 has a battery access door 142231. The battery access door 142231 is designed for easy opening and closing of the battery chamber 14223. The owner can then use the control panel 14222 to control when and the amount of time the driving device 1422 will drive the dispensing rotor 1421 by inputting such information into the digital control panel 14222.

In order to avoid the scenario of running out of battery of the control panel 14222, the control panel 14222 further has a battery indicator, which would show the status of the battery and provide a reminder to the owner when the battery level is low. When it is time to dispense food to the pet, the control panel 14222 activates the motor 14221 to dispense the pet food to the food dispensing outlet 1412.

The control panel 14222 is located on the surrounding wall 12, so as to provide easy access of the control panel 14222 to the owner. And, in order to provide protection, as well as easy access, of the control panel 14222, when the actuation is a control panel 14222, the surrounding wall 12 where the control panel 14222 is located is a double wall 12', wherein the control panel 14222 is provided between the double wall 12'. An outer wall 123' of the double wall 12' is designed for easy opening and closing, such that the control panel 14222 is protected therewithin, while capable of being easily accessed.

It is worth mentioning that the space within the double wall can be used as a secret compartment to store important documents (such as the birth certificate, vaccine records and medical records) of the pet, wherein another secret compartment access door will be provided to access the secret compartment either on the outer wall 123' of the double wall 12, or on the base of the pet house. Such documents can be stored within the house such that the owner does not look for it whenever he or she needs such documents.

According to FIG. 1 of the drawings, either way, the pet food stored within the food storage 133 will be dispensed towards the food dispensing outlet 1412 in a controlled manner, and the pet food will not leak through the food dispensing outlet 1412 unnecessarily.

Furthermore, the dispensing rotor 1421 of the food control valve 142 is not only for controlling when the pet food stored within the food storage 133 is to be dispensed, it also helps to control the amount of pet food to be dispensed through the food channel 141 towards the food dispensing outlet 1412.

The amount of food to be dropped through the dispensing channel 141 essentially depends on the operational period of the dispensing rotor due to the fact that the food control valve 142 cannot control the amount of food that enters from the food storage 133 into the food inlet 14111 of the food channel 141.

It can easily be seen the amount of food that will be dispensed into the food channel 141 essentially depends on the number of rotation of the dispensing rotor 1421, or, essentially, the operation time of the driving device 1422 of the dispensing rotor 1421. The longer the operational time of the driving device 1422, the more rotation the food propeller 14211 will perform, and the more pet food is dispensed through the food channel 141.

Furthermore, in order to provide maximum space for the pet, the food channel 141 and the food dispensing outlet 1412 are both located at a dispensing portion of the surrounding wall 12 of the pet house, such that the food channel 141 only runs through the dispensing portion 121 of the surrounding wall 12, leaving more room for the pet in the lodging room 121. As a result, the bottom wall 1331 of the food storage 133 gradually slopes downwardly to the food channel 141 such that the funnel shape slopes towards the dispensing portion of the surrounding wall 12.

In order to keep the dry pet food stored within the food storage 133 of the roof frame 13 fresh, the roof cover 132 is pivotally connected with the ceiling wall 131 to selectively enclose the food storage 133.

To even better protect the pet food stored within the food storage 133, the food control valve 142 further comprises a sealing valve 1423 which is operatively coupled at the food dispensing outlet 1412. It is also controlled by the driving device 1422 for normally sealing the food channel 141 at the food dispensing outlet 1412.

The driving device 1422 operates in such a manner that not only does it control the operation of the dispensing rotor 1421 but also the opening and closing of the sealing valve 1423, such that when the food control valve 142 is either manual or automatic, as mentioned above, the sealing valve 1423 will open up to allow the pet food to be dispensed through the food dispensing outlet 1412.

When the sealing valve 1423 is closed, the food channel 141 will be sealed off, such that no air, moisture, as well as insects such as ants or cockroaches, will enter into the food channel 141 through the food dispensing outlet 1412. As can be seen the sealing valve 1423 is provided for keeping the pet food stored within the food storage 133 fresh, as well as ensuring the hygienic condition of the pet house, such that the health of the pet will not be jeopardized.

It is worth mentioning that the sealing valve 1423 may be an electromagnetic valve or a solenoid controlled valve, such that when either the pedal 14222' is being stepped upon or when the timing period of the digital control penal 14222 is up, the battery will provide enough power to open up the sealing valve 1423.

In order to slow down the pet food dropping out from the food dispensing outlet 1412, so as to avoid the pet food from spilling everywhere when the pet food is dispensed, a food screen 1424 is also coupled at the food dispensing outlet 1412 in front of the sealing valve 1423. The food screen 1424 has a flexible drape structure, which helps slowing down the pet food from gushing out from the food dispensing outlet 1412, so as to allow the pet food to be dispensed out of the food dispensing outlet 1412 in a controlled manner.

To even better maintain the quality of the pet food after being placed within the food storage 133, the roof cover 132 has a sealing rim 1321. In order to match the sealing rim 1321 of the roof cover 132, the ceiling wall 131 has a sealing groove 1313 arranged in such a manner that when the roof cover 132 is pivotally folded on top of the ceiling wall 131, the sealing rim 1321 is engaged with the sealing groove 1313 in an airtight manner. The sealing rim 1321 and the sealing groove 131 sealedly enclose the food storage so as to prevent moisture, air and insects from entering into the food storage.

It is worth mentioning that the sealing rim 1321 is made of a squishy material, such as plastic, which would fills up the sealing groove 1313 of the ceiling wall 131, such that when the roof cover 132 is folded on top of the ceiling wall 131, the sealing rim 1321 is pressed against the sealing groove 1313 of the ceiling wall 131, such that air and moisture are prevented from entering into the roof frame 13 and preventing the pet food placed within the roof frame 13 from turning soggy.

Furthermore, the roof frame 13 and the food dispensing arrangement 14 provide a convenient and clean pet feeding experience for the owner. Conventionally, when owners have to provide pet food to their pets, they would have to open up the pack of pet food, use a container to scoop from the pet food from the pack, and transfer the food to the pet food bowl.

No doubt the owner would have to clean his/her hands before and after scooping the pet food from the pack. The present invention allows the owner to actually pour all the pet food into the roof frame 13 for dispensing. When the pet needs the pet food, the owner can provide the pet with the food without having to touch the pet food at all.

Also, referring to FIG. 3 of the drawings, the housing 10 further has an indication window which allows the pet owner to see into the food storage 133 such that the owner can determine whether or not pet food is still in the food storage 133. The indication window may be placed on the surrounding wall 12 or above the roof cover 132.

Figure 2:
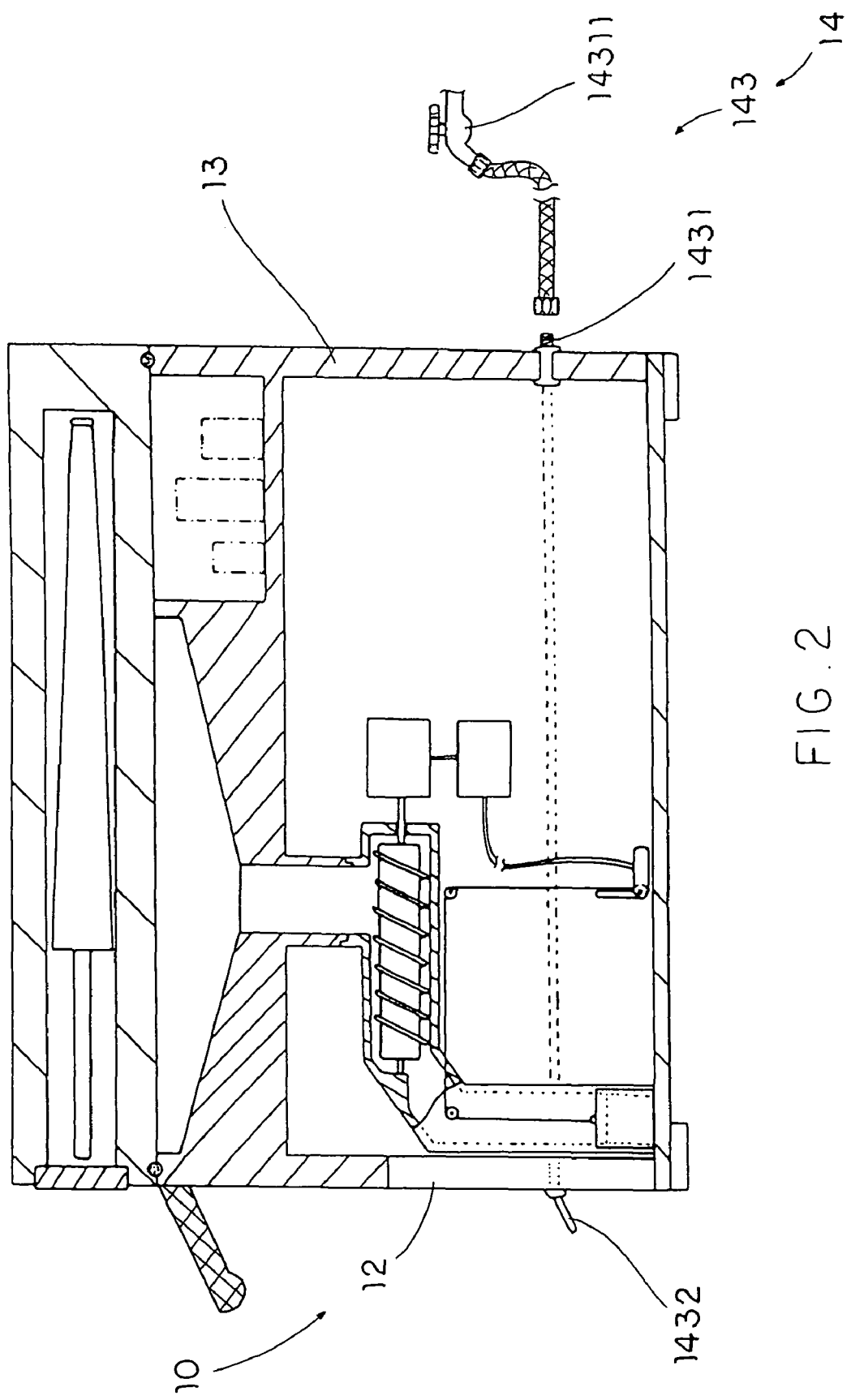
FIG. 2 is a sectional view of the pet house in a closed position according to the preferred embodiment of the present invention.

Referring to FIG. 2 of the drawings, in order for the pet house to be even more self-sufficient, the food dispensing arrangement 14 further has a water dispenser 143, which is supported by the housing 10. The water dispenser 143 has a water inlet 1431 and a water dispensing head 1432. The water inlet 1431 is adapted for connecting with a water source 14311. The water dispensing head 1432 protrudes from the surrounding wall 12 for controllably dispensing water from the water source 14311.

According to the preferred embodiment of the present invention, the water source 14311 is a water hose for connecting to the water inlet 1431, so as to provide the water dispenser 143 with water. The water dispensing head 1432 is provided for the pet to drink the water.

In order to allow the water to naturally flow towards the water dispensing head 1432, the water dispenser 143 slopes downward from the water inlet 1431 to the water dispensing head 1432, such that the water in the water dispenser 143 will not be stagnant.

According to the preferred embodiment of the present invention, the water dispensing head 1432 is a ball joint end, which the pet licks in order to obtain water. When the ball joint is not licked by the pet, no water will flow out, such that leakage is prevented. The use of a ball joint end allows the pet to control how much water itself needs by licking as much water out from the water dispenser 1432.

It is also worth pointing out that when water is needed to clean the pet house or to cool down the pet house, the water hose connected to the water inlet 1431 can be detached from the water inlet 1431 and used as a garden hose for cleaning the exterior of the pet house, and the roof frame 13 of the pet house, and even the lodging room 121, which would promote cleanliness of the pet house, which would in turn provide a better living environment for the pet.

The roof frame 13, the food dispensing arrangement 14 and the water dispenser 143 of the present invention provides great convenience and flexibility to pet owners. The present invention allows pet owners to go out for a longer period of time freely, without guilt or worries, even on traveling trips, without having to hire a "pet-sitter", put the pet in a pet hotel or feed the pet in unreasonable hours.

Referring to FIG. 3 of the drawings, for the comfort and well-being of the pet when it is in the pet house, especially in the summer time when it is hot and dry, the housing 10 further has ventilating means 15 for providing ventilation for the lodging room 121. The ventilating means 15 could simply be a ventilation window 151 provided on the surrounding wall 12 such that exchange of outside air and inside air can occur there.

However, according to the embodiment of the present invention, the ventilating means 15 further has a battery-powered ventilating fan 152 which is provided for an outside air to be pulled into the housing 10, and an inside air be pulled out of the lodging room 121, such that the air inside the lodging room 121 is kept fresh and the pet within the lodging room 121 ventilated.

Referring to FIG. 1 of the drawings in order to provide added convenience to the owner, as well as more comfort for the pet, the pet house further comprises an outdoors shading arrangement 20 containing an umbrella compartment 21 provided at the roof frame 13.

The outdoors shading arrangement 20 comprises an outdoor umbrella 22, which is arranged in such a manner that when the outdoor umbrella 22 is folded in a closed position, the outdoor umbrella 22 is adapted to be received in the umbrella compartment 21 in a hidden manner.

And when the outdoor umbrella 22 is in an opened position, the outdoor umbrella 22 is adapted to be supported by the housing 10 to create a shading area under the outdoor umbrella 22 for the pet resting thereunder.

Of course, a size of the umbrella compartment 21 needs to be big enough for the outdoor umbrella 22 to be placed therewithin. In order to take the outdoor umbrella 22 in and out of the compartment, the umbrella compartment 21 further has an umbrella compartment door 211 provided on the roof frame 13, such that the outdoor umbrella 22 can be taken out of the umbrella compartment 21 when the umbrella compartment door 211 in an opened position.

It is worth mentioning that the outdoor umbrella 22 placed within the umbrella compartment 21 may be used by the owner or the pet. The reason is that pet houses very often are placed outside of the house, which means that pet houses may be exposed to bright sunlight on a sunny day, and rain on a rainy day, which may cause discomfort to the pet.

When the user feel that the outdoor umbrella 22 has to be used, the user may simply open the umbrella compartment 21 and reach for the outdoor umbrella 22, such that the owner does not have to run around the house to obtain an umbrella for the pet, which is very convenient for the owner in situations like sudden rain showers.

Furthermore, according to FIG. 3 of the drawings, in order to allow the outdoor umbrella 22 to be used to shield the pet house and the pet but without having the owner to hold on to the outdoor umbrella 22, the shading arrangement 20 further comprises an umbrella holder 23 which is provided on the housing 10.

The umbrella holder 23 is adapted for an outdoor umbrella arm 221 to be held therein, such that the outdoor umbrella 22 is supported by the umbrella holder 23 for holding the outdoor umbrella 22 in place so that when the user wishes to use the outdoor umbrella 22 to shield the pet house and the pet from the sun or rain, he or she does not have to hold the outdoor 22 umbrella in person.

It is worth mentioning that the umbrella holder 23 is a detachable umbrella holder, such that the umbrella holder 23 can be detached from the housing 10 when it is not needed for holding the umbrella 22. The detached umbrella holder may also be placed within the umbrella compartment 21, such that it will be misplaced and that the pet owner may conveniently locate both the umbrella 22 and the umbrella holder 23 when they are needed.

According to FIG. 3 of the drawings, the housing 10 further comprises a guiding light 17, which is provided for providing light to guide the pet around the pet house when it is dark. The guiding light 17 is battery powered which has a solar sensor and a solar panel, wherein the solar sensor is provided for detecting when the night light is to operate. During day time, the guiding light 17 will not operate, and when night falls, the solar sensor will detect that natural light is diminishing and the guiding light 17 will therefore start to operate, so as to provide light for the pet such that the pet may move around freely around the pet house area. The pet owner will therefore not have to worry about the pet getting lost or bump into the pet house when the pet is moving around.

The battery of the guiding light 17 is a rechargeable, which is connected to the solar panel which will collect solar energy from the sun and store the energy within the rechargeable battery, such that the owner does not have to worry about the battery of the guiding light 17 running low and the guiding light 17 could not provide light to the pet when it is needed.

According to the preferred embodiment of the present invention, the guiding light 17 is provided on the surrounding wall 12, especially close to the area where the food dispensing outlet 1412 and the water dispenser 143 are located, such that the pet may access such facilities with ease even at night.

In order to efficiently provide a plurality of amenities, including tangible or intangible amenities, such as the above food dispensing arrangement 14, ventilation means 15, and the guiding light 17, as add on features for the pet house, the pet house of the present invention further provides a solar power system to conveniently and efficiently supply power for the amenities, which may need to be electrically powered to provide a relatively more comfortable and luxury environment for the beloved pet of the owner, so as to provide the features for the convenience of the pet and the owner of the pet to enhance the quality of living for the pet.

Figure 5:
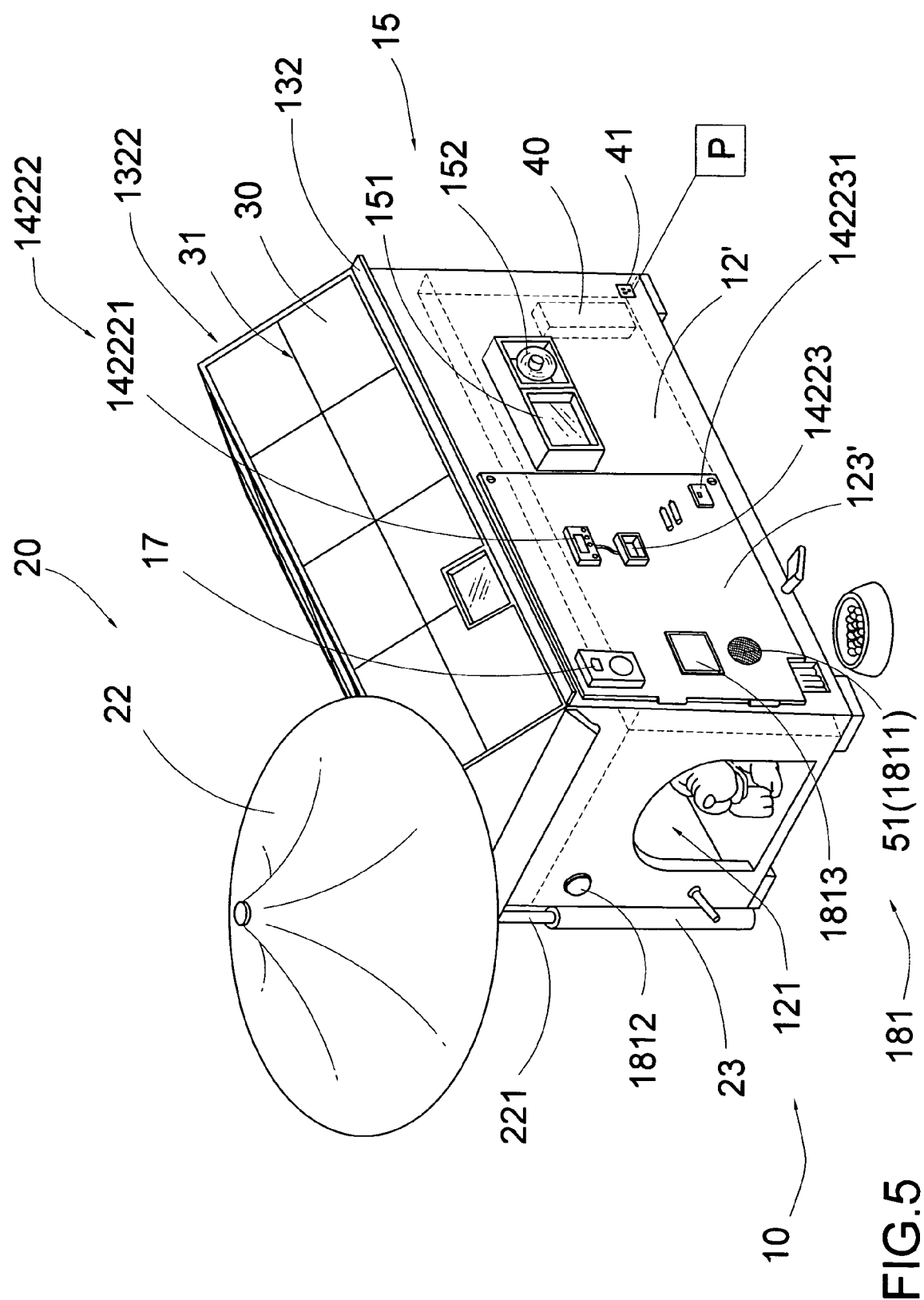
FIG. 5 is a perspective view of the pet house according to the preferred embodiment of the present invention, illustrating a solar power system incorporating with the pet house.
Figure 6:
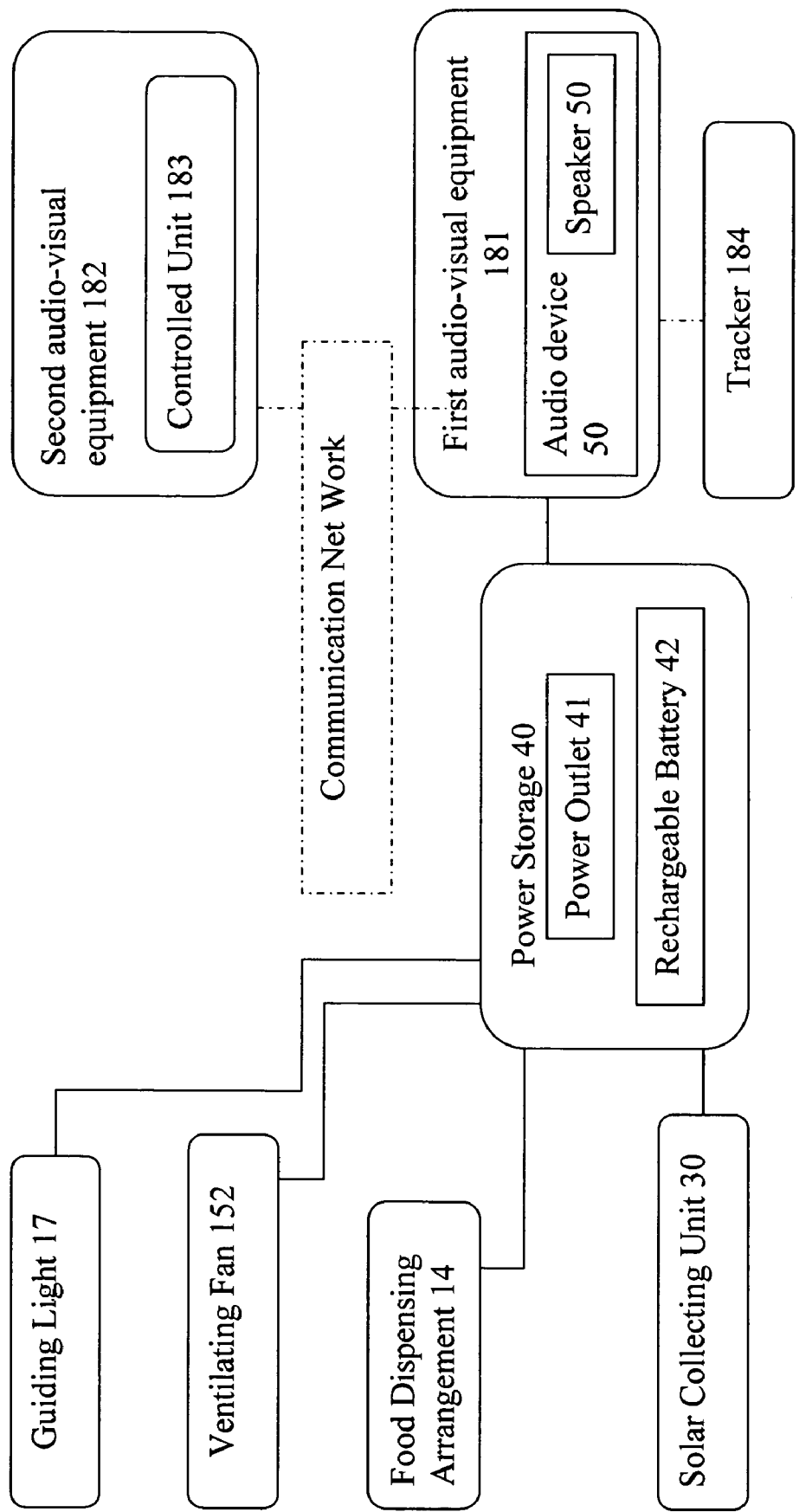
FIG. 6 is a block diagram of the amenities of the pet house according to the preferred embodiment of the present invention.
Figure 7:
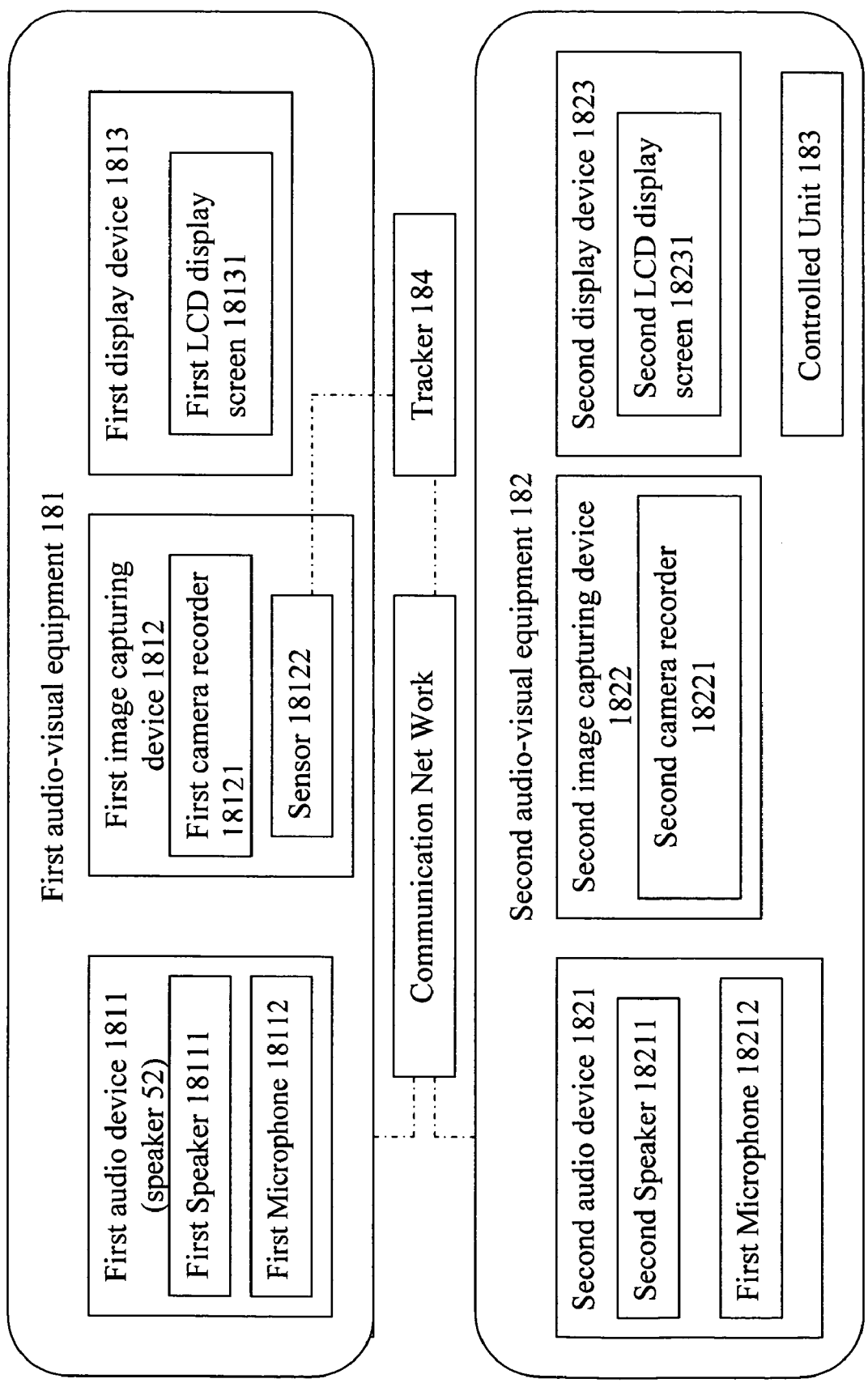
FIG. 7 is a block diagram of the intercommunication system of the pet house according to the preferred embodiment of the present invention.

Referring to FIGS. 5, 6 and 7 of the drawings, the solar power system, as one of the amenities, comprises a comprises a solar collecting unit 30 preferably supported by an outer surface 1322 of the roof cover 132, wherein the solar collecting unit 30 has a solar collecting surface 31 arranged to face toward the sunlight so that it can be exposed to sunlight for extensively collecting solar energy. Moreover, the solar collecting unit 30 is adapted to collect solar energy from the sunlight impinged on the solar collecting surface 31 of the solar collecting unit 30, and covert the collected solar energy into electrical energy, wherein the electrical energy can be stored for further use.

It is worth mentioning that the solar collecting unit 30 is preferably attached on the outer surface 1322 of the roof cover 132 having a shape matching a contour of the outer surface 1322 of the roof cover 132, so that the solar unit 30 is incorporated with the roof cover 132 and alignedly overlaid on the outer surface 1322 of the roof cover 132 to fully utilize the outer surface 1322 of the roof cover 132 and toward the direction of the sun, so as to maximize a gain of the solar energy.

The solar power system further comprises a power storage 40 electrically connected to the solar collecting unit 30 for storing the electrical energy converted from the solar collecting unit 30, wherein the power storage 40 electrically connects the amenities of the pet house for powering the amenities of electronic devices, as shown in FIG. 6.

The power storage 40 is further electrically connected to a power outlet 41 preferably provided at the surrounding wall 12 in a hand-reachable position for plugging and unplugging to an external power source, such as an AC power source, so that the electric energy from the power storage 40 can also provide electricity to the amenities of electronic devices through the power outlet 41. When the electrical energy level stored in the power storage 40 is low, the power storage 40 can be charged by electrically connecting the external power source via the power outlet 41. Therefore, the solar power system can provide the electricity to the amenities even in the fair light without plugging to the external power source.

Accordingly, the power storage 40 is electrically coupled with said solar collecting unit 30 through an electrical cable which is extended in a hidden manner, such as hiding the electrical cable within a molding frame of the pet house. Therefore, the electrical cable is protected by the molding frame to prevent the damage of the electrical cable being bit or chewed by the pet, so as to protect the safety of the pet from being electrically shocked.

The guiding light 17 as one of the amenities is mounted at the housing 10 for providing illumination via a light sensor. It is worth to mention that the ventilating fan 152 and the guiding light 17 are electrically powered by the power storage 40.

According to the preferred embodiment, the pet house further comprises an audio device 50, as one of the amenities, provided at the base 11 of the housing 10, wherein the audio device 50 comprises one of more speakers 51 supported at the housing 10 and an audio input 52 operatively coupling with the speaker 51 such that when the audio input 52 sends an audio signal to the speaker 51, the speaker 51 is adapted for producing audio sound as an additional function for the pet house.

The audio input 52 can be an auxiliary input for communicatively connecting a portable music player to receive the audio signal therefrom, such that the audio signal is transmitted to the speakers 51 for music broadcasting. Alternatively, the audio input 52 can be a wireless receiver, such as a FM receiver or "Bluetooth receiver" to electrically connect with the speakers 51 for wirelessly connecting with the portable music player to wirelessly send the audio signal from the portable music player to the speakers 51 for music broadcasting. The audio device 50 can further comprises a radio broadcasting circuit for receiving radio wave as the audio signal, such that the audio signal transmits to the speakers 51 for radio broadcasting. In other words, the user and/or the pet can listen to the music from his or her portable music player or to the radio through the audio device 50 of the present invention. It is worth to mention that the audio device 30 is electrically connected to the power storage 40, such that the audio device 30 can be powered by the solar collecting unit 30.

As shown in FIGS. 6 and 7, a remote intercommunication system for a pet and a pet owner of the pet according to the preferred embodiment of the present invention is illustrated, in which the remote intercommunication system comprises a first audio-visual equipment 181 and a second audio visual equipment 182.

The first audio-visual equipment 181 comprises at least one first audio device 1811 and at least one first video capturing device 1812 electrically communicate with each other, wherein the first audio device 1811 and the first video capturing device 1812 are positioned at a predetermined location of the pet house in which the pet resides (i.e. in the vicinity of the pet), so that the first audio device 1811 is capable of generating/recording an audio signal to and from the pet, and that the first video capturing device 1812 is capable of capturing a real-time visual image of that pet. Accordingly, the first video capturing device 1812 of first audio-visual equipment 181 is preferably located in the vicinity of the side entrance 122 of the surrounding wall 12 for conveniently capturing the image of the pet. Accordingly, the first audio device 1811 can be the speaker 51 of the audio device 50 as a common audio tool for providing sound effect.

The second audio-visual equipment 182 comprises a second audio device 1821 and a second display device 1823 electrically communicate with each other and positioned in a vicinity of the pet owner who is in a remote geographical location from the location of the pet, wherein the second audio-visual equipment 182 is electrically communicated with the first audio-visual equipment 181 at a distance from the first audio-visual equipment 181 via a communication network, such that the pet owner is able to visually and audibly communicate with the pet through the first audio-visual equipment 181 and the second audio-visual equipment 182 so as to carefully monitor a condition in which the pet is being treated when the pet owner is not physically accompanying the pet.

According to the preferred embodiment of the present invention, the first audio-visual equipment 181 further comprises a first display device 1813 electrically connected with the first audio device 1811 and the first video capturing device 1812 for displaying images sent from the second audio-visual equipment 182. Accordingly, the second audio-visual equipment 182 further comprises a second video capturing device 1822 electrically connected with the second audio device 1821 and the second display device 1823 for capturing an image of the pet owner to be sent to the first audio-visual equipment 181, wherein the image is arranged to be displayed by the first displaying device 1813 and is shown to the pet. Accordingly, the first audio device 1811 and the first video capturing device 1812 are wireless devices for wirelessly sending out the audio signal and the visual image.

The remote intercommunication system further comprises a communication control unit 183 electrically connected to at least the second audio-visual equipment 182 for controlling an operation of the audio-visual equipment and/or the first audio visual equipment 181. The communication control unit 183 may be embodied as a variety of different devices, such as a personal computer pre-loaded with a predetermined program and connected to Internet for controlling the operation of the first and the second audio-visual equipment 181, 182, wherein the first and the second audio device 1811, 1821, the first and the second video capturing device 1812, 1822, and the first and the second display device 1813, 1823 are embodied as the corresponding computer accessories of the control unit 183.

The first and the second audio device 1811, 1821 comprise a first and a second speaker 18111, 18211 respectively adapted for delivering audible sound to an intended recipient. Furthermore, the first and the second video capturing device 1812, 1822 comprise a first and a second camera recorder 18121, 18221 respectively mounted at a predetermined position for capturing image of the targeted pet and the pet owner. Similarly, the first and the second display unit 1813, 1823 comprise a first and a second LCD display screen 18131, 18231 respectively for visual displaying the image captured by the corresponding video capturing device 1812 (1822).

The first audio-visual equipment 181 further comprises a sensor 18122 of the first video capturing device 1812, and a tracker 184 corresponding to the sensor 18122 for generating a signal being received by the sensor 18122, wherein the tracker 184 is provided for being worn by the pet, in such a manner that the first video capturing device 1812 is able to rotatably move the capturing angle regarding to the movement of the pet in a predetermined capturing area.

It is appreciated that the tracker 184 may be able to record the real-time image of the situation of the house of the owner. If there is any stranger walked in to the surrounding area of the house, the pet may run toward the stranger, so as to capture the image of the stranger for security purpose. It is also worth pointing out the tracker 184 is preferably a GPS, so that the tracker 184 is capable of being used as a tracking device of the pet for tracking the pet location through a communication network.

Moreover, the first and the second audio device 1811, 1821 further comprise a first and a second microphone 18112, 18212 adapted for recording analog audio signal, wherein the recorded audio signal will be generated through the corresponding first or the second speaker 18111, 18211 as controlled by the controlled unit 183.

Accordingly, when the control unit 183 is embodied as a computer pre-loaded with a predetermined program and connected to Internet, each of the first and the second speaker 18111, 18211 are embodied as a computer speaker which is arrange to generate audible sound when controlled by the computer as the control unit 183. Similarly, the first and the second camera recorder 18122, 18221 are embodied as two webcams respectively for capturing the image at a predetermined angle. Finally, the first and the second LCD display screen 18131, 18231 are embodied as two LCD monitors electrically connected with the computer as the control unit 183 for monitoring the image captured by the corresponding image capturing device 1812 (1822).

The operation of the present invention is as follows: the user may, through the control unit 183, gain access to the first and the second audio-visual equipment 181, 182 so that he or she may selectively activate the first and the second audio device 1811, 1821, the first and the second image capturing device 1812, 1822 and the first and the second display device 1813, 1823. Since the second display device 1823 shows the pet image as captured by the first image capturing device 1812, the user is able to observe his or pet in a real-time basis through the second display device 1823. The user may also speak to the pet by using the first and the second audio device 1811, 1821 (i.e. the corresponding microphone and speaker 18111, 18211, 18112, 18212). Conversely, the pet may see its owner through the first display device 1813 (the image of the pet owner is captured by the second image capturing device 1822) and communicate with the pet owner through the first and the second audio device 1811, 1821.

Accordingly, the first audio-visual equipment 181 is electrically connected to the power storage 40 to supply the electricity that the audio-visual equipment 181 is needed, as shown in FIG. 6. The first audio-visual equipment 181 is able to wirelessly connect to the second audio-visual equipment 182 through the communication net work, such as Internet and/or GPS system. The amenities of the pet house are able to be individually controlled by individual controllers or centrally and digitally controlled by the digital control panel 14222 of the actuation.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pet house for accommodating a pet therein, comprising:
   a housing which comprises:
   a surrounding wall having a lodging room for said pet accommodating therein, and a side entrance communicating with said lodging room;
   a roof frame, which is supported on said surrounding wall to define said lodging room within said surrounding wall and said roof frame, wherein said roof frame comprises a ceiling wall mounted on top of said surrounding wall to cover said lodging room and a roof cover movably mounted on said ceiling wall, wherein a food storage is formed between said ceiling wall and said roof cover and is arranged for storing pet food to add an additional weight as a downward loading force on said housing so as to enhance said housing in a stably constructing manner;

a plurality of amenities provided at said pet house for providing the comfort and convenience of said pet house so as to enhance the quality of living; and a food dispensing arrangement for dispensing said pet food from said food storage, wherein said food dispensing arrangement comprises a food channel having a food inlet extending to said ceiling wall to communicate with said food storage and a food dispensing outlet downwardly extended to a bottom side of said housing, and a food control valve operatively coupled with said food channel for controlling a predetermined amount of said pet food dispensing from said food storage at said food inlet to said food dispensing outlet, wherein a bottom wall of said food storage has a funnel shape that said bottom wall of said food storage is sloped towards said food inlet for guiding said pet food moving towards said food inlet by gravity.

2. The pet house, as recited in claim 1, wherein said food control valve comprises a dispensing rotor having a food propeller rotatably supported within said food channel at said food inlet thereof for controllably feeding a predetermined of said pet food from said food storage, a driving device operatively driving said dispensing rotor to rotate at a predetermined number of revolution so as to dispense said pet food to said food dispensing outlet, and a sealing valve which is operatively coupled at said food dispensing outlet and is controlled by said driving device for normally sealing said food channel at said food dispensing outlet, and a food screen coupled at said food dispensing outlet in front of said sealing valve for slowing down said pet food dropping out from said food dispensing outlet.

3. The pet house, as recited in claim 2, wherein said food dispensing arrangement further comprises a water dispenser, which is supported by said housing, having a water inlet adapted for connecting with a water source and a water dispensing head protruding from said surrounding wall for controllably dispensing water from said water source.

4. A pet house for accommodating a pet therein, comprising:

a housing which comprises:

a surrounding wall having a lodging room for said pet accommodating therein, and a side entrance communicating with said lodging room, wherein said housing further comprises an eave handle outwardly and inclinedly extended from said surrounding wall at a position above said side entrance for not only sheltering said side entrance but also easy carrying said housing;

a roof frame, which is supported on said surrounding wall to define said lodging room within said surrounding wall and said roof frame, wherein said roof frame comprises a ceiling wall mounted on top of said surrounding wall to cover said lodging room and a roof cover movably mounted on said ceiling wall, wherein a food storage is formed between said ceiling wall and said roof cover and is arranged for storing pet food to add an additional weight as a downward loading force on said housing so as to enhance said housing in a stably constructing manner, wherein said roof cover is pivotally connected with said ceiling wall to selectively enclose said food storage, wherein said roof cover has a sealing rim and said ceiling wall has a sealing groove arranged when said roof cover is pivotally folded on top of said ceiling wall, said sealing rim is engaged with said sealing groove in an airtight manner to sealedly enclose said food storage for preventing moisture entering into said food storage, wherein said roof frame, which is made of waterproof material, is detachably mounted on top of said surrounding wall to allow said housing to be disassembled for transporting and cleaning purposes;

a plurality of amenities provided at said pet house for providing the comfort and convenience of said pet house so as to enhance the quality of living; and a food dispensing arrangement for dispensing said pet food from said food storage, wherein said food dispensing arrangement comprises a food channel having a food inlet extending to said ceiling wall to communicate with said food storage and a food dispensing outlet downwardly extended to a bottom side of said housing, and a food control valve operatively coupled with said food channel for controlling a predetermined amount of said pet food dispensing from said food storage at said food inlet to said food dispensing outlet, wherein a bottom wall of said food storage has a funnel shape that said bottom wall of said food storage is sloped towards said food inlet for guiding said pet food moving towards said food inlet by gravity.

5. The pet house, as recited in claim 4, wherein said food control valve comprises a dispensing rotor having a food propeller rotatably supported within said food channel at said food inlet thereof for controllably feeding a predetermined of said pet food from said food storage, a driving device operatively driving said dispensing rotor to rotate at a predetermined number of revolution so as to dispense said pet food to said food dispensing outlet, and a sealing valve which is operatively coupled at said food dispensing outlet and is controlled by said driving device for normally sealing said food channel at said food dispensing outlet, and a food screen coupled at said food dispensing outlet in front of said sealing valve for slowing down said pet food dropping out from said food dispensing outlet.

6. The pet house, as recited in claim 5, wherein said food dispensing arrangement further comprises a water dispenser, which is supported by said housing, having a water inlet adapted for connecting with a water source and a water dispensing head protruding from said surrounding wall for controllably dispensing water from said water source.

* * * * *

UNITED STATES PATENT AND TRADEMARK OFFICE
CERTIFICATE OF CORRECTION

| | | |
|---|---|---|
| PATENT NO. | : 8,113,148 B2 | Page 1 of 1 |
| APPLICATION NO. | : 12/454197 | |
| DATED | : February 14, 2012 | |
| INVENTOR(S) | : Shiuan Kuen Chern | |

It is certified that error appears in the above-identified patent and that said Letters Patent is hereby corrected as shown below:

In the cover page, item (76), the Name of Inventor: "Shiuan Kuen Chem" should read --Shiuan Kuen Chern--.

Signed and Sealed this
Twenty-ninth Day of May, 2012

David J. Kappos
*Director of the United States Patent and Trademark Office*